US011449679B1

(12) United States Patent
Hazel et al.

(10) Patent No.: US 11,449,679 B1
(45) Date of Patent: Sep. 20, 2022

(54) METHODS AND SYSTEMS TO FACILITATE REDUCTION AND INCREMENTAL MODELING THROUGH SET THEORY PRIME FACTORIZATION

(71) Applicant: TrenderTag, Inc., Andover, MA (US)

(72) Inventors: Thomas Hazel, Boston, MA (US);
Betsy Bilhorn, Seabrook, NH (US);
Atharva Mungee, San Jose, CA (US)

(73) Assignee: TrenderTag, Inc., Andover, MA (US)

( * ) Notice: Subject to any disclaimer, the term of this patent is extended or adjusted under 35 U.S.C. 154(b) by 0 days.

(21) Appl. No.: 17/516,613

(22) Filed: Nov. 1, 2021

Related U.S. Application Data

(60) Provisional application No. 63/273,980, filed on Oct. 31, 2021.

(51) Int. Cl.
*G06F 17/00* (2019.01)
*G06F 40/30* (2020.01)
*G06F 40/279* (2020.01)
*G06F 40/205* (2020.01)
*H04L 51/52* (2022.01)

(52) U.S. Cl.
CPC ............ *G06F 40/30* (2020.01); *G06F 40/205* (2020.01); *G06F 40/279* (2020.01); *H04L 51/52* (2022.05)

(58) Field of Classification Search
None
See application file for complete search history.

(56) References Cited

U.S. PATENT DOCUMENTS

| | | | | |
|---|---|---|---|---|
| 8,266,137 | B2* | 9/2012 | Lei | G06F 16/319 707/715 |
| 9,466,071 | B2* | 10/2016 | Pennacchiotti | G06F 16/9535 |
| 10,097,522 | B2* | 10/2018 | Philipp | H04L 9/0894 |
| 10,552,488 | B2* | 2/2020 | Pennacchiotti | G06Q 50/01 |
| 11,102,314 | B2* | 8/2021 | Liu | G06Q 30/01 |
| 2019/0197125 | A1* | 6/2019 | Ma | G06F 16/438 |
| 2021/0211479 | A1* | 7/2021 | Trim | H04L 67/26 |

* cited by examiner

*Primary Examiner* — Satwant K Singh
(74) *Attorney, Agent, or Firm* — Procopio, Cory, Hargreaves & Savitch LLP.

(57) ABSTRACT

Apparatus, methods, and computer-readable media facilitating reduction and incremental modeling through set theory prime factorization are disclosed herein. An example method includes identifying one or more topics associated with content of a social media message. The example method also includes mapping each of the one or more topics to a respective set key to generate a set list associated with the social media message. Additionally, the example method includes recording the set list associated with the social media message in memory.

16 Claims, 10 Drawing Sheets

| Set (Topic) | Set Elements | Set Key |
|---|---|---|
| Animal | Cat, Dog, Kitty, Puppy, Fish, Bird, ... | 3 |
| Vehicle | Car, Bike, Bus, Convertible, Mustang, ... | 5 |
| Platform | Family, Photos, Chatting, Streaming, Videos, ... | 7 |
| Medicine | Vaccine, Flu, ... | 11 |
| Application | Vaccine Passport, ... | 13 |
| Entertainment | Restaurants, Clubs, Shows, ... | 17 |
| Feline | Cat, Kitty, Tiger, Lion, ... | 19 |
| Land Animal | Cat, Dog, Kitty, Puppy, Mustang, ... | 23 |
| Water Animal | Fish, Shark, Octopus, ... | 29 |
| Air Animal | Bird, Bat, ... | 31 |
| Color | Red, Yellow, Brown, ... | 41 |

FIG. 4

| Message ID | Timestamp | Content | Set List | Set List | Set List | Set List |
|---|---|---|---|---|---|---|
| 0001 | 1/1/2021, 3pm | Your vaccine card could soon be required at the best restaurants, clubs, and shows. We explain how to save a digital copy and register with eligible vaccine passport apps. | 7, 11, 13, 17 | 7, 11, 13, 17, 17, 17 | 17017 | 4917913 |
| 0002 | 1/1/2021, 3:03pm | @journalist2, I have always loved brown mustangs. | 5, 7, 41 (23) | 5, 7, 41 (23) | 1435 | 1435 |

FIG. 5

METHODS AND SYSTEMS TO FACILITATE REDUCTION AND INCREMENTAL MODELING THROUGH SET THEORY PRIME FACTORIZATION

CROSS REFERENCE TO RELATED APPLICATION(S)

This application claims the benefit of and priority to U.S. Provisional Application Ser. No. 63/273,980, entitled "METHODS AND SYSTEMS TO FACILITATE REDUCTION AND INCREMENTAL MODELING THROUGH SET THEORY PRIME FACTORIZATION" and filed on Oct. 31, 2021, which is expressly incorporated by reference herein in its entirety.

INTRODUCTION

Field of Technology

The present disclosure relates generally to the field of data modeling, and, more particularly, to methods and systems to facilitate reduction and incremental modeling through set theory.

BACKGROUND

Data modeling may refer to taking data and forming datasets that can train a model to produce some outcomes. In the case of social media services that generate content, the data may be mainly textual, and may be sparse with high dimensionality. Analysis and organization of data in high-dimensional spaces can be challenging and include substantial processing complexity. For example, as the dimensionality increases, the volume of the space may quickly increase so that the available data becomes sparse. This sparsity may become problematic for methods that use statistical significance. In some aspects, machine-learning models may become proportionally more time-consuming and/or expensive to leverage as information complexity and volume increases.

SUMMARY

Aspects presented herein provide solutions to these problems, for example, by reducing complexity of information for modeling, as well as incrementally updating models to be evaluated. Principal Component Analysis is an example unsupervised technique for reducing dimensionality. Linear Discriminant Analysis is an example supervised technique for reducing dimensionality. However, these approaches may still cause the same problem they are intended to resolve (e.g., reducing the number of dimensions).

Aspects may reduce the number of dimensions (e.g., inputs or variables) processed at a machine-learning model to improve performance. Aspects disclosed herein facilitate processing of streams of information, including large, disparate, and/or complex streams of information in such a way that novel insights (e.g., actions) may be delivered, for example, via a recommendation service disclosed herein. Aspects disclosed herein provide techniques for constructing such information (e.g., an information set). Additionally, aspects disclosed herein provide a framework in which one or more machine learning techniques may be leveraged by the recommendation service. For example, aspects disclosed herein may leverage one or more machine learning techniques to identify patterns within the information set.

In one example, the recommendation service may be used to help a user navigate social media to identify conversations at the right time to increase reach and/or engagement associated with the user. For example, a user may use the example recommendation service to identify topics and/or conversations that are of importance to customers of the user. In such examples, the user may use the identified topics and/or conversations to create an engaged follower base.

According to one aspect of the present disclosure, a method for information modeling is provided. The example method includes identifying one or more topics associated with content of a social media message. The example method also includes mapping each of the one or more topics to a respective set key to generate a set list associated with the social media message. Additionally, the example method includes recording the set list associated with the social media message in memory.

In another example aspect, a computer apparatus for information modeling is provided. The example computer apparatus includes memory and at least one processor coupled to the memory. The memory and the at least one processor are configured to identify one or more topics associated with content of a social media message. The memory and the at least one processor is also configured to map each of the one or more topics to a respective set key to generate a set list associated with the social media message. Additionally, the memory and the at least one processor is configured to record the set list associated with the social media message in memory.

According to another example aspect, a computer-readable medium is provided comprising instructions that comprises computer executable instructions for performing any of the methods disclosed herein. The computer-readable medium may be a non-transitory, computer-readable storage medium, for example.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 represents an example data table that may be stored by a recommendation service representing one or more set definitions, in accordance with various aspects of the present disclosure.

FIG. 5 represents an example data table that may be stored by a recommendation service representing social media messages and respective sets mapped to each of the social messages, in accordance with various aspects of the present disclosure.

DETAILED DESCRIPTION OF THE INVENTION

Figure 1:
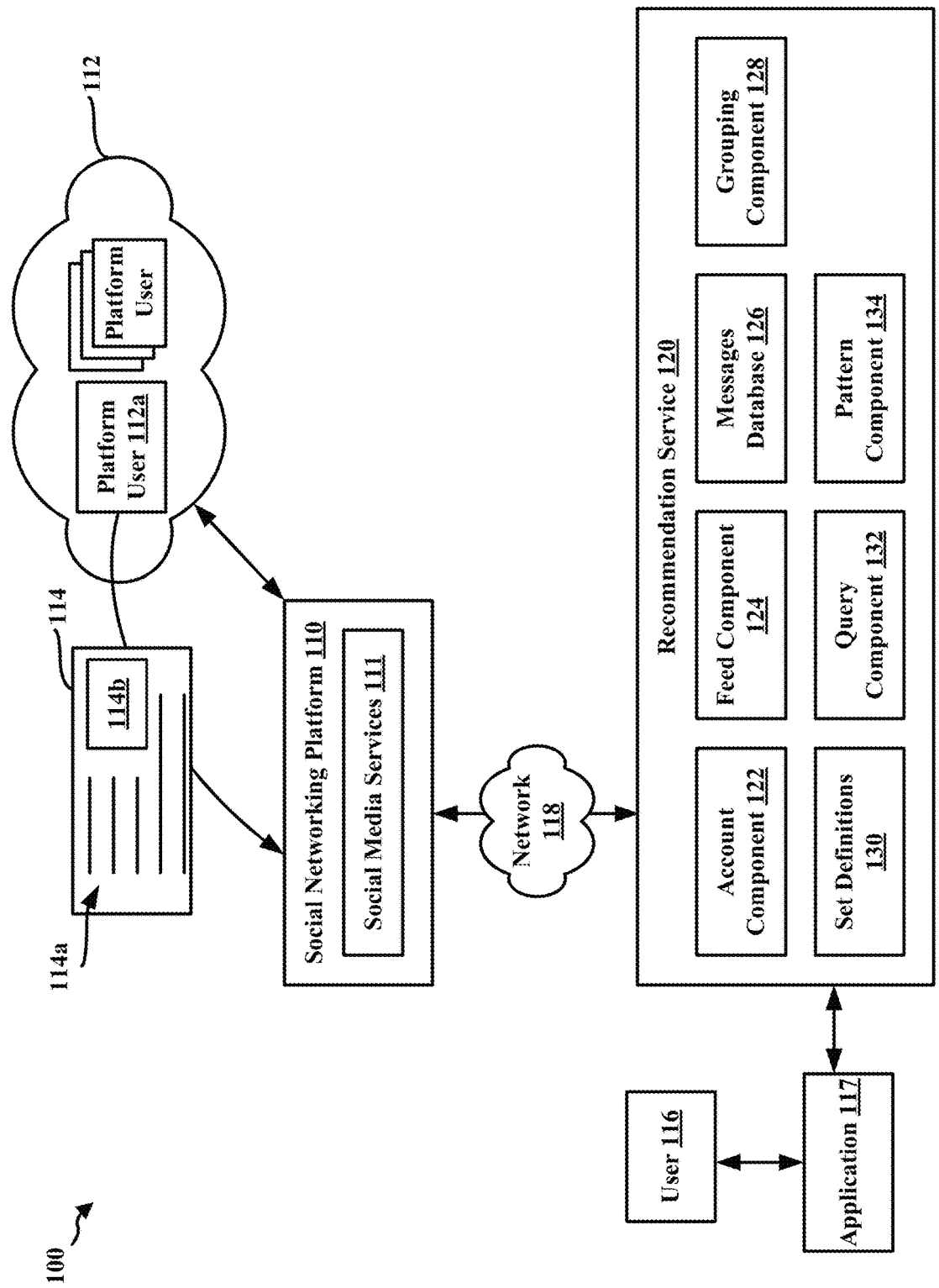
FIG. 1 is a block diagram illustrating a system for indexing and searching data stored in object storage, in accordance with various aspects of the present disclosure.

Example aspects are described herein in the context of a system, method, and computer program product for performing information modeling. For example, example aspects describe utilizing set theory prime factorization modeling to collapse information into sets that map to distinct prime numbers. A system may receive information content from various sources of data. In some aspects, the sources of content may include various sources of social media content. The system may also receive indication(s) from a user regarding interest, or interest levels, in various types of content or subject matter. Based on the user information from a particular user, the set theory prime factorization modeling aspects presented herein may be used to identify particular content from the various sources of data that are likely to be of interest to the user. An identification of the content may then be sent to a user device for the user.

As disclosed herein, aspects of a recommendation service may parse the contents of a social media message and identify one or more sets that may represent the contents of the social media message. The recommendation service may then map the one or more sets to distinct keys (e.g., prime numbers) that also represent the contents of the social media message. For example, a social media message may include content that states "I like brown horses." The recommendation service may parse the content of the social media message and identify a first set "Colors" based on the term "brown" and identify a second set "Animals" based on the term "horses." The recommendation service may then map the first set to a first key (e.g., a first prime number) and map the second set to a second key (e.g., a second prime number different than the first prime number). That is, different sets may be associated with different unique prime numbers so that a first prime number may be consistently mapped to a same first set, a second prime number may be consistently mapped to a same second set, etc. In this manner, the recommendation service may reduce the information of the social media message (e.g., the content) to a set list of keys based on the identified sets (or topics).

The disclosed aspects may facilitate classification of information through Set Theory via "like functions" or "grouping." The disclosed aspects may also represent the identified sets through prime numbers, which may also facilitate set correlation through prime multiplication. For example, the set list associated with a social media message may be represented as a product of the keys associated with the respective identified sets of the social media message. For example, a social media message may be associated with three sets that map to a first key "3," a second key "5," and a third key "7." In such examples, the set list may be represented as a product of the keys (e.g., 3*5*7=105). Thus, the topics of the social media message may be represented via a single number (e.g., 105) rather than words. Reconstituting the one or more sets associated with the social media message may then be performed via prime factorization techniques. For example, performing prime factorization on the number "105" results in three prime factors (e.g., 3, 5, and 7). The recommendation service may then map the prime factors to their restive sets to determine the topics associated with the social media message.

Leveraging machine-learning to identify patterns in information may be difficult. The example set theory prime factorization modeling techniques disclosed herein simply the process of taking complex forms of information (e.g., the content of social media messages) and reducing the information down to basic number constructs that machine-learning models can handle. A prime number (or a product of prime numbers) is the building block of analysis where patterns may be discovered via the machine-learning model. From the analysis, the resultant output (e.g., prime numbers) can be associated back into sets (e.g., topics) to facilitate taking an action.

Thus, it may be appreciated that the set theory prime factorization modeling techniques disclosed herein facilitate built-in information normalization and classification into sets. The sets are assigned unique prime numbers representing some concepts. The concepts may be categorized by "like words" and their meanings. Additionally, complex concepts may be produced through set operations. Sets increase or decrease weight as elements are added or removed, respectively. Sets that are multiplied may be efficiently reconstituted via factorization.

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

FIG. 1 is a diagram illustrating an example environment in which a system 100 may operate to facilitate reduction and incremental modeling through set theory, as presented herein. The example system 100 includes a social networking platform 110 and a recommendation service 120. The social networking platform 110 provides social media services 111 to platform users 112 of the social networking platform 110. The social media services 111 may include one or more services that allow the platform users 112 to share information (e.g., text, images, data, etc.) in a virtual community and/or a virtual network. Examples of social networking platforms include, for example, Internet forums (e.g., message boards), blogs, micro blogs, social networks, etc. Although the example of FIG. 1 illustrates one social networking platform, it may be appreciated that a platform user may subscribe to multiple social networking platforms and, thus, may share information to the one or more social networking platforms.

The example platform users 112 may access the social media services 111 using a user device, such as a mobile device (e.g., a cellular phone, a smart phone, a tablet, etc.), a laptop, a smart television, an in-vehicle infotainment system, etc. The example social networking platform 110 may record social media messages posted by users of the social media services 111 and a timestamp associated with the posting of the social media message. As shown in FIG. 1, a platform user 112a may post a message 114 that is recorded by the social networking platform 110. The message 114 includes message content 114a (e.g., text, images, data, etc.) and is associated with a message timestamp 114b.

In the illustrated example of FIG. 1, the recommendation service 120 enables a user 116 to navigate social media to be in the right conversations at the right time to increase reach and/or engagement. For example, the recommendation service 120 may indicate how and when to engage (e.g., "like," "follow," "share," "comment," "post," and/or "message") with platform users 112 of the social media services 111. For example, the recommendation service 120 may provide a notification and/or alert to the user 116 to engage with trending content. In some examples, the recommendation service 120 may provide a dashboard "heat map" of keywords, topics, influencers, platforms, etc.

The user 116 may access the recommendation service 120 via an application 117. The application 117 may include a browser-based application, a mobile-based application, and/or a stand-alone application. The application 117 may be configured to store, retrieve, modify, and/or access data associated with the recommendation service 120 via an application programming interface ("API"), REST-based interface (e.g., using PUT, GET, LIST operations), or other interfaces exposed by the recommendation service 120.

In the illustrated example of FIG. 1, the recommendation service 120 includes an account component 122, a feed component 124, a messages database 126, a grouping component 128, a query component 132, and a pattern component 134.

The example account component 122 enables the user 116, via the application 117, to access the recommendation service 120. For example, the user 116 may login to the recommendation service 120 via user credentials (e.g., a username and password, biometrics, etc.). In some examples, the user 116 may login to the recommendation service 120 via a Single-Sign-On (SSO) social platform.

Figure 2:
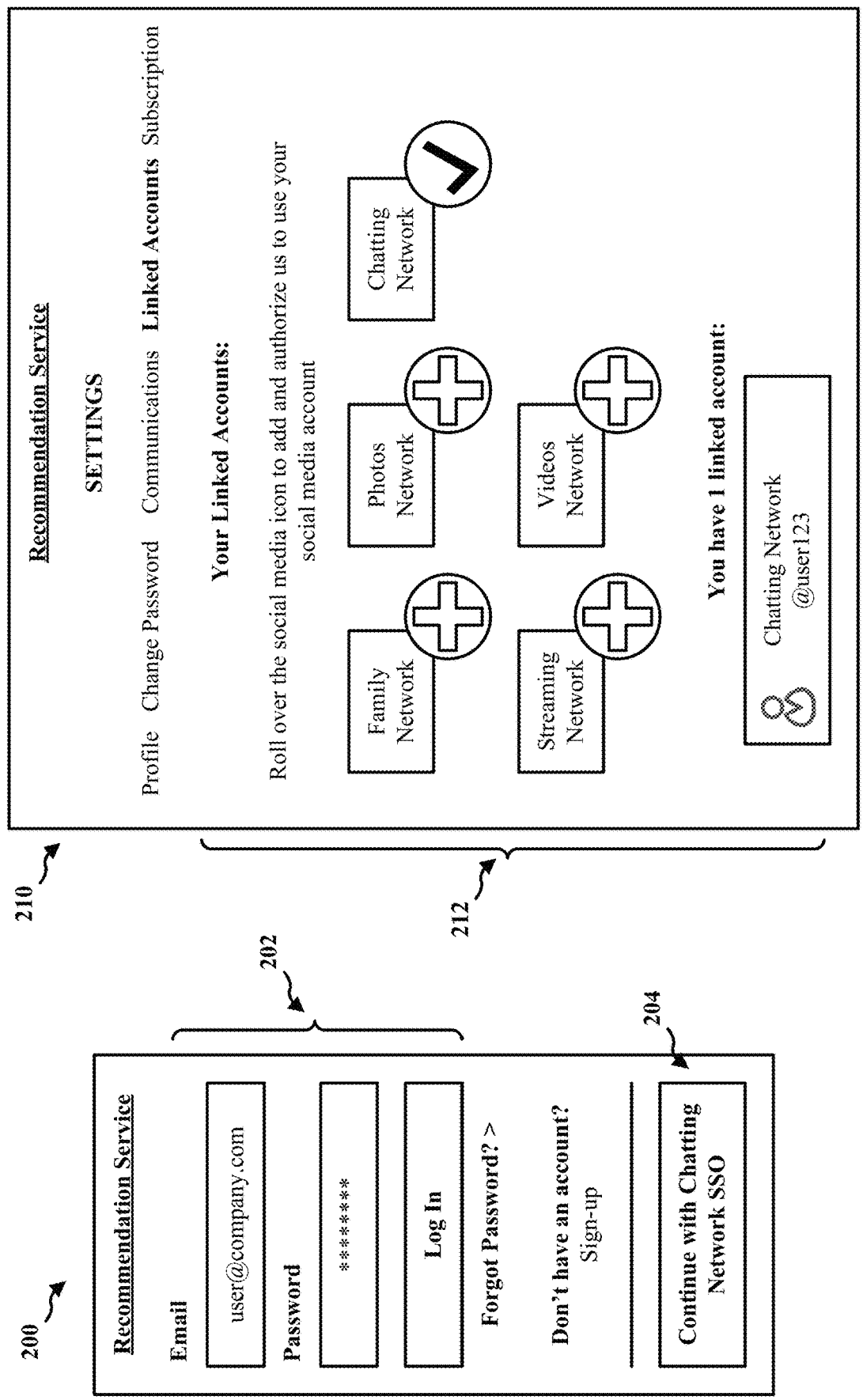
FIG. 2A illustrates an example graphical user interface that may be presented to a user to facilitate login to a recommendation service, in accordance with various aspects of the present disclosure.
FIG. 2B illustrates an example graphical user interface that may be presented to a user via an application to facilitate managing account settings of the user, in accordance with various aspects of the present disclosure.

FIG. 2A illustrates an example graphical user interface 200 that may be presented to a user (e.g., the user 116 of FIG. 1) to facilitate login to the recommendation service 120. Aspects of the graphical user interface 200 may be provided via the application 117. As shown in FIG. 2A, the graphical user interface 200 includes a first option 202 to login to the recommendation service 120 ("Recommendation Service") via an identity (e.g., email/password) and a second option 204 to login to the recommendation service 120 via a platform SSO. In examples in which the user 116 uses the second option 204 (e.g., the platform SSO), the account component 122 may automatically connect to the social network platform associated with the platform SSO. For example, when using the second option 204, the account component 122 may use the credentials provided by the user 116 to access the recommendation service 120 and the associated social networking platform ("Chatting Network"). Although the example of FIG. 2A includes one option for platform SSO, other examples may include any suitable quantity of platform SSO options, such as zero, two, three, etc.

FIG. 2B illustrates an example graphical user interface 210 that may be presented to a user (e.g., the user 116 of FIG. 1) via the application 117 to facilitate managing account settings of the user. As shown in FIG. 2B, the user may manage their profile ("Profile"), their password ("Change Password"), their communication preferences ("Communications"), their linked social networking accounts ("Linked Accounts"), and their subscription settings ("Subscription"). In other examples, additional or alternative account settings may be managed via the graphical user interface 210.

In the illustrated example of FIG. 2B, the option to manage linked social networking accounts is selected and the graphical user interface 210 includes a portion 212 indicating what social media services the user may access and which (if any) social media services the user has authorized the recommendation service 120 to access. As shown in FIG. 2B, the user has authorized the recommendation service 120 to access one social media service ("Chatting Network"). The example graphical user interface 210 of FIG. 2B also identifies a user handle ("user123") used to identify the user via the social media service. Additionally, the user may additionally add and authorize the recommendation service 120 (e.g., via the account component 122) to link additional social media services (e.g., a "Family Network," a "Photos Network," a "Streaming Network," and a "Videos Network"). It may be appreciated that other examples may include additional or alternative social media services that the user may link.

Referring again to the example system 100 of FIG. 1, after the user 116 has linked at least one social media service (e.g., the "Chatting Network") to their account, the recommendation service 120 may start obtaining social media information from the social networking platform 110 associated with the linked social media service. In the illustrated example of FIG. 1, the recommendation service 120 is in communication with the social networking platform 110 via a network 118. The example network 118 may be implemented using any suitable wired network and/or wireless network. As used herein, the phrase "in communication," including variances thereof, encompasses direct communication and/or indirect communication through one or more intermediary components and does not require direct physical (e.g., wired) communication and/or constant communication. For example, the recommendation service 120 may be in communication with the social networking platform 110 at periodic intervals, aperiodic intervals, or as one-time events. user1

The example recommendation service 120 transmits one or more queries to the social networking platform 110 via the network 118. For example, the feed component 124 of the recommendation service 120 may transmit the one or more queries to the social networking platform 110 to collect social media messages of interest at periodic intervals (e.g., every Sunday evening, every 24 hours, etc.), at aperiodic intervals (e.g., upon user login to the recommendation service 120), and/or as a one-time event. In the illustrated example of FIG. 1, the one or more queries may indicate topic identifiers and/or user identifiers. The topic identifiers may be one or more keywords and/or hashtags that are associated with particular topics (e.g., animal, vehicle, platform, etc.) and result in one or more social media messages that are relevant to the particular topic being identified. The user identifiers may be identifiers that are associated with the user, such as the user handle (e.g., "user123" of FIG. 2B), platform user(s) who follow the user via the social networking platform 110, and/or platform user(s) who the user follows via the social networking platform 110.

In the illustrated example, the recommendation service 120 and/or the feed component 124 stores the social media messages returned by the social networking platform 110 in a messages database 126. In some examples, the feed component 124 may include a timestamp with each of the social media messages indicating a data and/or time associated with when a respective social media message was recorded at the social networking platform 110 and/or at the messages database 126. The messages database 126 may be implemented by a volatile memory and/or a non-volatile memory. While in the illustrated example the messages database 126 is illustrated as a single database, in other examples, the messages database 126 may be implemented by any number and/or types of databases.

Figure 3:
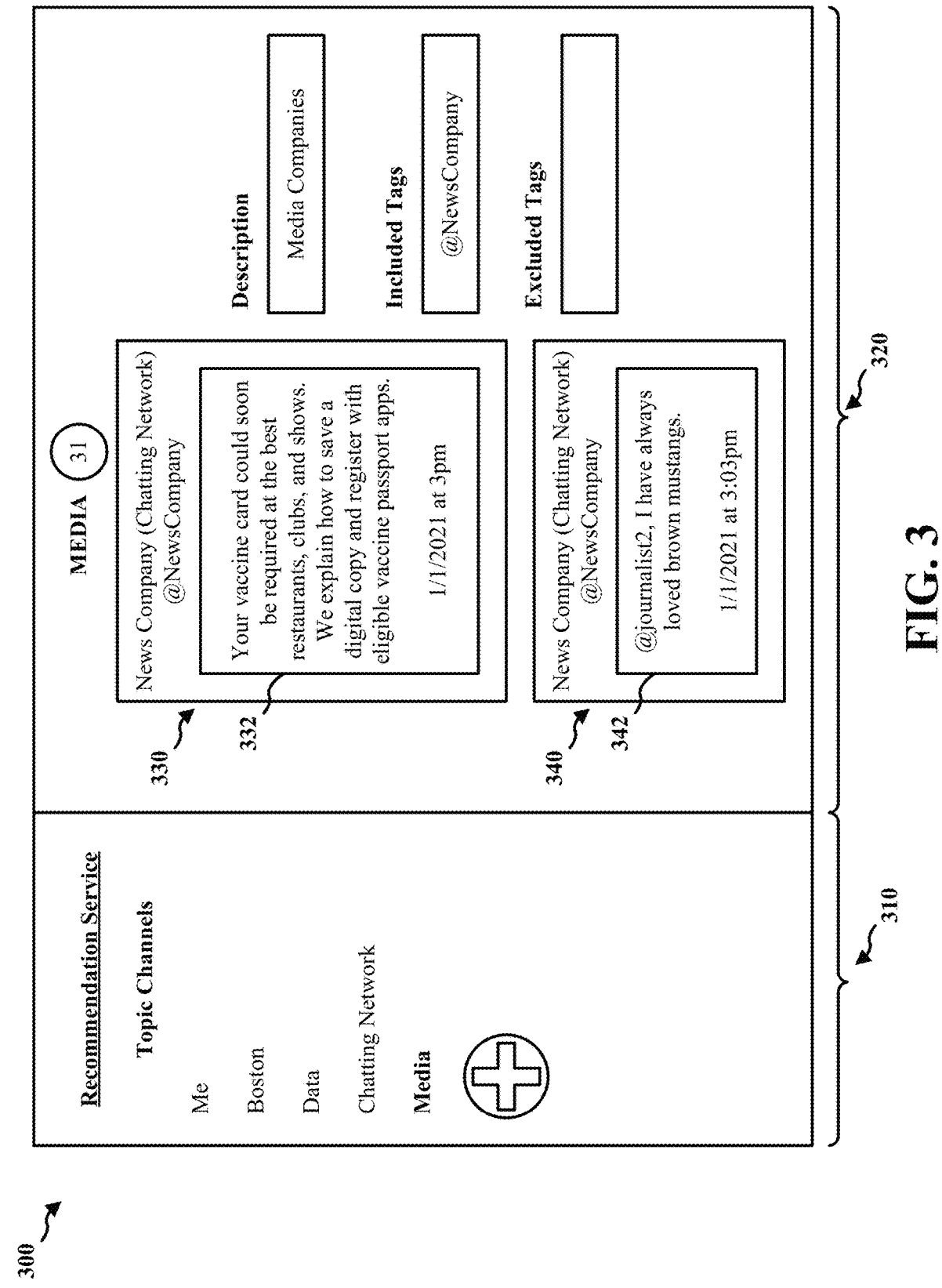
FIG. 3 illustrates an example graphical user interface that may be presented to a user via an application to facilitate viewing social media messages of interest to the user from their one or more subscribed and linked social media services, in accordance with various aspects of the present disclosure.

The recommendation service and/or the feed component 124 may populate a user interface viewable by the user 116 based on the social media messages returned by the social networking platform 110. FIG. 3 illustrates an example graphical user interface 300 that may be presented to a user (e.g., the user 116 of FIG. 1) via the application 117 to facilitate viewing social media messages of interest to the user from their one or more subscribed and linked social media services. As shown in FIG. 3, a first panel 310 of the graphical user interface 300 includes one or more channels (or topics) that the user may view. When a channel is selected, the application 117 may present one or more social media messages from the messages database 126 that include the topic. In the example of FIG. 3, the first panel 310 includes a user channel ("Me"), a Boston channel ("Boston"), a data channel ("Data"), a Chatting Network channel ("Chatting Network"), and a media channel ("Media"). The first panel 310 also includes an option to add a new channel. As shown in FIG. 3, the media channel ("Media") channel is selected.

The graphical user interface 300 also includes a second panel 320 that includes the social media messages filtered based on the selected channel. For example, the second panel 320 includes a first social media message 330 and a second social media message 340. In the illustrated example, the first social media message 330 and the second social media message 340 were each posted by the same media company ("News Company") using the same user handle ("NewsCompany"). The first social media message 330 includes first content 332 and the second social media message 340 includes second content 342. As shown in FIG. 3, the second panel 320 also indicates a quantity of social media messages (e.g., 31) associated with the selected channel ("Media"). The user may also update the definition of the selected channel by including one or more keywords (e.g., "tags"), such as "NewsCompany," and/or by excluding one or more keywords.

As described above, aspects disclosed herein provide techniques for reducing information that can be analyzed. For example, aspects disclosed herein leverage Sets with respect to storing, retrieving, and analyzing information. A grouping function quickly normalizes and classifies information into a small representation that can be stored and/or analyzed in many ways and reconstituted. The grouping function is part of a natural language normalization and classification where the data point is a set. Thus, performing normalizing functions on the actual content may be avoided since placing the content (e.g., a word) into a specific set normalizes and classifies the content.

For example, a social media message may include the words "Cat," "Kitty," "Car," and "Convertible." The grouping function may covert the first word "Cat" and the second word "Kitty" into a first set, such as "Feline." The grouping function may also convert the third word "Car" and the fourth word "Convertible" into a second set, such as "Vehicle." Thus, the social media message may be represented by two sets (e.g., the "Feline" set and the "Vehicle" set). It may be appreciated that a word may be part of one or more sets. For example, the first word "Cat" may be part of the first set "Feline" and may also be part of a third set "Land Animals." In some examples, the weight of a set (e.g., when performing an analysis on the social media messages) may be based on the quantity of elements (or words) that are included in the respective set.

Referring again to the example system 100 of FIG. 1, the recommendation service 120 includes the grouping component 128 to facilitate consistently converting content (e.g., words) into specific prime numbers associated with a set topic. For example, the grouping component 128 may parse the content of a social media message and normalize/classify the content into one or more sets. The grouping component 128 may covert the content based on one or more set definitions 130. Each of the one or more set definitions 130 may include one or more elements (or keywords) that are included in the respective set and that may be used to covert content into a set. In some examples, the one or more set definitions 130 may be pre-defined. In some examples, the one or more set definitions 130 may be user generated.

FIG. 4 represents an example data table 400 that may be stored by the recommendation service 120 and/or the grouping component 128 of FIG. 1 representing the example one or more set definitions 130 of FIG. 1. The example data table 400 includes example sets and elements (or keywords) associated with each set. The example data table 400 of FIG. 4 includes a set identifier column 402, an elements identifier column 404, and a set key identifier column 406. The set identifier column 402 identifies sets (or topics). The elements identifier column 404 includes one or more elements associated with a respective set. The set key identifier column 406 includes a prime number that may be used to represent the respective set.

The example data table 400 of FIG. 4 includes eleven rows. An example first row 410 indicates that a first topic ("Animal") includes the set elements "Cat," "Dog," "Kitty," "Puppy," "Fish," "Bird," etc. An example second row 412 indicates that a second topic ("Vehicle") includes the set elements "Car," "Bike," "Bus," "Convertible," "Mustang," etc. An example third row 414 indicates that a third topic ("Platform") includes the set elements "Family," "Photos," "Chatting," "Streaming," "Videos," etc. An example fourth row 416 indicates that a fourth topic ("Medicine") includes the set elements "Vaccine," "Flu," etc. An example fifth row 418 indicates that a fifth topic ("Application") includes the set elements "Vaccine Passport," etc. An example sixth row 420 indicates that a sixth topic ("Entertainment") includes the set elements "Restaurants," "Clubs," "Shows," etc. An example seventh row 422 indicates that a seventh topic ("Feline") includes the set elements "Cat," "Kitty," "Tiger," "Lion," etc. An example eighth row 424 indicates that an eighth topic ("Land Animal") includes the set elements "Cat," "Dog," "Kitty," "Puppy," "Mustang," etc. An example ninth row 426 indicates that a ninth topic ("Water Animal") includes the set elements "Fish," "Shark," "Octopus," etc. An example tenth row 428 indicates that a tenth topic ("Air Animal") includes the set elements "Bird," "Bat," etc. An example eleventh row 430 indicates that an eleventh topic ("Color") includes the set elements "Red," "Yellow," "Brown," etc.

The grouping component 128 of FIG. 1 may use the set elements to identify one or more sets to which content (e.g., a word) belongs. That is, the grouping component 128 may normalize and categorize the content into sets (or topics) based on the set elements. For example, by parsing the first content 332 of the first social media message 330 of FIG. 3, the grouping component 128 may determine that the first content 332 is associated with at least four example sets based on the data table 400 of FIG. 4. For example, the grouping component 128 may identify a first set "Platform" based on the "Chatting" network associated with the first social media message 330. The grouping component 128 may also identify a second set "Medicine" based on the set element "Vaccine" included in the first content 332. The grouping component 128 may also identify a third set "Application" based on the set element "Vaccine Passport" included in the first content 332. The grouping component 128 may also identify a fourth set "Entertainment" based on the set elements "Restaurants," "Clubs," and "Shows" included in the first content 332.

In a similar manner, the grouping component 128 may determine that the second social media message 340 of FIG. 3 is associated with at least three example sets based on the data table 400 of FIG. 4. For example, the grouping component 128 may identify a first set "Color" based on the set element "Brown" included in the second content 342. The grouping component 128 may also identify a second set "Vehicle" based on the set element "Mustang" included in the second content 342. The grouping component 128 may also identify a third set "Platform" based on the "Chatting" network associated with the second social media message 340.

In some examples, content in a social media message that is not included in the set elements of the one or more sets is mapped to an empty set. Thus, for example, words such as "The," "A," "I," etc. may not map to one of the one or more sets defined by the one or more set definitions 130 of FIG. 1 and may, instead, be mapped to any empty set.

It may be appreciated that in some examples, a set element may be included in multiple sets. In some examples, the grouping component 128 may associate the content with each of the multiple sets. For example, the set element "Mustang" is included in the "Vehicle" set and the "Land Animal" set. In such examples, the grouping component 128 may associate the content (e.g., the word "Mustang") with the "Vehicle" set and the "Land Animal" set. In some examples, the grouping component 128 may use context clues to determine a subset of the multiple sets to associate with the content. For example, the grouping component 128 may determine that other sets associated with the social media message are related to animals and, thus, the content "Mustang" in the corresponding social media message is more probable to be associated with the "Land Animal" set than the "Vehicle" set. In some examples, the context clues associated with content in a first social media message may include one or more of content within the first social media message, content within social media messages recorded within a threshold period of the first social media message (e.g., the first social media message may be part of a thread including a plurality of social media messages discussing different types of animals), topics associated with the user, and/or topics associated with the platform user posting the first social media message.

After the content is normalized and classified into sets (or topics), the grouping component 128 may also reduce the different sets associated with a social media message (e.g., a set list) into prime numbers using, for example, the set keys associated with each of the sets. As shown in FIG. 4, each of the sets is also associated with a corresponding set key. In the illustrated example, the set keys are prime numbers that may be used to represent the set (or topic). For example, the first set "Animal" may be represented by the prime number "3," the second set "Vehicle" may be represented by the prime number "5," etc.

As one example, the first social media message 330 of FIG. 3 includes six set elements (e.g., "Chatting," "Vaccine," "Vaccine Passport," "Restaurants," "Clubs," and "Shows") that map to four sets (e.g., "Platform," "Medicine," "Applications," and "Entertainment"). The grouping component 128 may use the example data table 400 to map each of the four sets to a respective set key. For example, the grouping component 128 may reduce the content of the first social media message 330 to the four prime numbers "7," "11," "13," and "17." The grouping component 128 may store the respective set keys (or prime numbers) with the respective social media message in the messages database 126.

FIG. 5 represents an example data table 500 that may be stored by the recommendation service 120 and/or the grouping component 128 of FIG. 1 representing the social media messages and respective sets mapped to each of the social messages. The example data table 500 of FIG. 5 includes a message identifier column 502, a timestamp column 504, a content column 506, a first set list column 508, a second set list column 510, a third set list column 512, and a fourth set list column 514.

It may be appreciated that the example data table 500 is merely an illustration of an example data table that may be used to index the social media messages retrieved by the feed component 124 from the social networking platform 110. Other examples may use additional or alternative techniques to index the social media messages retrieved by the feed component 124. For example, the feed component 124 may use an inverted index to associate the social media messages with a set.

The example message identifier column 502 indicates an identifier of the social media message. The example timestamp column 504 indicates a data and/or time at which the social media message identified by the message identifier column 502 was posted on the social media service. The example content column 506 indicates the content that was posted to the social media service. The example set list columns indicate one or more sets identified based on the content of the content of the message identified by the message identifier column 502 and the one or more set definitions (e.g., the data table 400 of FIG. 4).

The example data table 500 includes two example rows corresponding to social media messages. An example first row 520 indicates that a first social media message (e.g., the first social media message 330 of FIG. 3) is associated with the message ID "0001," was posted on Jan. 1, 2021, at 3 pm, and that the identified social media message includes the content "Your vaccine card could soon be required at the best restaurants, clubs, and shows. We explain how to save a digital copy and register with eligible vaccine passport apps."

An example second row 522 indicates that a second social media message (e.g., the second social media message 340 of FIG. 3) is associated with the message ID "0002," was posted on Jan. 1, 2021, at 3:03 pm, and that the identified social media message includes the content "@journalist2, I have always loved brown mustangs."

As mentioned above, the example set list columns indicate one or more sets identified based on the content of the content of the message identified by the message identifier column 502 and the one or more set definitions (e.g., the data table 400 of FIG. 4). In the first set list column 508, the set list includes the set key (or prime number) associated with each distinct set. For example, with respect to the first social media message associated with the message ID "0001," the "Platform" set is mapped to the prime number "7," the "Medicine" set is mapped to the prime number "11," the "Application" set is mapped to the prime number "13," and the "Entertainment" set is mapped to the prime number "17."

In a similar manner, with respect to the second social media message associated with the message ID "0002," the "Vehicle" set is mapped to the prime number "5," the "Platform" set is mapped to the prime number "7," and the "Color" set is mapped to the prime number "41." It may be appreciated that in the example of FIG. 5, the set element "mustangs" is associated with one set (e.g., the "Vehicle" set) and, thus, the respective set list includes the set key "7" associated with the "Vehicle" set. However, as mentioned above, in some examples, a set element may be included in multiple sets. For example, the set element "mustangs" is included in the "Vehicle" set and the "Land Animal" set. In such examples, the set list included in the first set list column 508 may also include the set key "23" mapping to the "Land Animal" set.

In the second set list column 510, the set list includes the set key (or prime number) associated with each identified set element. For example, with respect to the first social media message associated with the message ID "0001," three set elements (e.g., "Restaurants," "Clubs," and "Shows") are mapped to the "Entertainment" set. In such examples, the set key (or prime number) associated with the "Entertainment" set is included three times along with the set keys associated with the other identified sets. With respect to the second social media message associated with the message ID "0002," as each identified set is associated with one set element, the set list included in the second set list column 510 is the same as the set list included in the first set list column 508.

In the third set list column 512, the set list includes a product based on the keys included in the first set list column 508. For example, with respect to the first social media message associated with the message ID "0001," the set keys associated with the four identified sets (e.g., "7," "11," "13," and 17") are expressed as a product (e.g., 7*11*13*17=17017). With respect to the second social media message associated with the message ID "0002," the set keys associated with the three identified sets (e.g., "5," "7," and 41") are expressed as a product (e.g., 5*7*41=1435).

In a similar manner, the set list of the fourth set list column 514 includes a product based on the keys included in the second set list column 510. For example, with respect to the first social media message associated with the message ID "0001," the set keys associated with the six set elements and the four identified sets (e.g., "7," "11," "13," and 17") are expressed as a product (e.g., 7*11*13*17*17*17=4917913). With respect to the second social media message associated with the message ID "0002," the set keys associated with the three identified sets (e.g., "5," "7," and 41") are expressed as a product (e.g., 5*7*41=1435).

Although the example data table 500 of FIG. 5 includes four example set list columns, other examples may include additional or alternative set list columns. For example, a data table may include a combination of the four example set list columns, such as the first set list column 508 and the third set list column 512, may include the second set list column 510 and the fourth set list column 514, may include one set list column, etc.

Thus, aspects disclosed herein may reduce the content of a social media message to a single term (e.g., a product based on the respective set keys). For example, the content of the second social media message ("@journalist2, I have always loved brown mustangs") may be reduced to a single number ("1435").

In the illustrated example of FIG. 5, the data table 500 includes the content column 506. However, in other examples, the data table 500 may exclude the content column and/or may discard the content included in the content column once the content in a row is mapped to a set list. By including the content column 506, queries and/or analysis of the social media messages in the messages database 126 may be lossless. For example, analysis of the social media messages in the messages database 126 may indicate that the first social media message (e.g., message ID "0001") may include content directed to medicine. In a lossless database, the content of the first social media message may be reproduced (e.g., for presentment to the user). In a lossy database, the content in the content column may be excluded and/or discarded. In such a lossy database, analysis of the social media messages in the messages database 126 may indicate that the first social media message (e.g., message ID "0001") may include content directed to medicine, but the content may not be reproduced.

As disclosed herein, information stored in the messages database may be queried and/or analyzed. For example, and referring to the example system 100 of FIG. 1, the recommendation service 120 may include a query component 132 that is configured to query for social media messages stored in the messages database 126 based on topics. For example, the user 116 may input one or more search terms (e.g., a word or a combination of words) via the application 117. In some examples, the one or more search terms may correspond to a topic (or channel), as described in connection with the first panel 310 of FIG. 3. For example, the query component 132 may receive the one or more search terms and convert the search terms into one or more sets based on the one or more set definitions 130. The query component 132 may then identify one or more social media messages in the feed component 124 based on the set keys (or prime numbers) mapping to the respective identified sets and the set lists included in the messages database 126.

For example, the user 116 may search for social media messages that were posted via the "Chatting Network" platform. The query component 132 may use the example data table 400 of FIG. 4 to convert the search term "Chatting Network" to the "Platform" set (as shown in the example third row 414) and map the "Platform" set to the set key "7." The query component 132 may use the mapped set key "7" to then parse the social media messages stored in the messages database 126 to identify the one or more social media messages that are associated with the identified "Platform" set. For example, the query component 132 may return the first social media message indicated by the message ID "0001" and the second social media message indicated by the message ID "0002" as the set list for each social media message includes the set key "7."

As described above, in some examples, the set lists may be stored as a product of the one or more sets identified via the content of the corresponding social media message. In such examples, the query component 132 may use prime factorization techniques to identify the component sets of the product. Prime factorization refers to the decomposition of a composite number into a product of smaller prime numbers. For example, performing prime factorization techniques on the number "105" results in the prime factors "3," "5," and "7." Performing prime factorization techniques on the number "8977781" results in the prime factors "181," "193," and "257."

In a similar manner, with respect to the first social media message identified by the message ID "0001" of FIG. 5, performing prime factorization on the product "17017" included in the third set list column 512 results in the prime factors "7," "11," "13," and "17," and performing prime factorization on the product "4917913" included in the fourth set list column 514 results in the prime factors "7," "11," "13," "17," "17," and "17." With respect to the second social media message identified by the message ID "0002" of FIG. 5, performing prime factorization on the product "1435" included in the third set list column 512 and the fourth set list column 514 results in the prime factors "5," "7," and "41."

Thus, when performing a query for the search term "Chatting Network," the query component 132 may use the set lists associated with each of the social media messages in the messages database 126 to return the one or more social media messages of interest.

In addition to efficiently identifying the one or more social media messages of interest based on the one or more search terms, reducing the information (e.g., content) of a social media message to a prime number (or product of prime numbers) also enables leveraging set operations on the set lists. For example, the Union operation may be used to efficiently identify the social media messages that include all elements present in one or more sets. For example, a first set may include the "Animal" set and a second set may include the "Color" set. The Union operation of the first set and the second set may result in producing any social media messages with sets lists that include the set key "3" and/or the set key "41."

The Intersection operation may be used to efficiently identify the social media messages that include common elements present in one or more sets. For example, a first set may include the "Animal" set and a second set may include the "Feline" set. The Intersection operation of the first set and the second set may result in producing any social media messages with set lists that include the set key "3" and the set key "19."

The Difference of Sets operation may be performed to identify elements present in a first set but not in a second set. For example, a first set may include the "Animal" set and a second set may include the "Land Animal" set. The Difference of Sets operation on the first set and the second set may result in producing any social media messages included in the "Animal" set but not included in the "Land Animal" set, such as animals included in the "Water Animal" set and/or the "Air Animal" set.

In another example, a superset may be formed based on the Union operation performed on the one or more sets. For example, with respect to the example sets of the set identifier column 402 of FIG. 4, an "Animal" superset may be formed based on applying the Union operation on the "Animal" set, the "Feline" set, the "Land Animal" set, the "Water Animal" set, and/or the "Air Animal" set.

It may be appreciated that additional or alternative set operations may be available to be performed.

As described above, the one or more set definitions 130 may be pre-defined and/or user generated. In some examples, the one or more set definitions 130 may be dynamically generated based on, for example, patterns identified in the set lists. For example, a "Metrics" set may be generated based on analysis of the set lists included in the messages database 126 over time. The "Metrics" set may include set elements that may be used to score topics, feeds, engagements, and/or influence. For example, the "Metrics" set may include set elements such as "Likes," "Posts," "Followers," etc.

In some examples, the recommendation service 120 may include the pattern component 134 to learn patterns associated with the social media messages. For example, the pattern component 134 may apply a machine-learning model (sometimes referred to as a "machine-learning algorithm") to learn patterns associated with topics associated with the social media messages. A machine-learning model may be a computational device or may represent a method performed by a computational device. Machine-learning models may provide predictive modeling, adaptive control, and other applications through training via a dataset. The machine-learning model may be adaptive based on external or internal information that is processed by the machine-learning model. Machine-learning may provide non-linear statistical data models or decision making and may model complex relationships between input data and output information.

A machine-learning model may be trained based on supervised learning or reinforcement learning. During training, the machine-learning model may be provided with input that the model uses to compute an output. The actual output may be compared to a target output, and the difference may be used to adjust parameters (such as weights and biases) of the machine-learning model in order to provide an output closer to the target output. Before training, the output may be incorrect or less accurate, and an error or difference may be calculated between the actual output and the target output. The weights of the machine-learning model may then be adjusted so that the output is more closely aligned with the target output.

As disclosed herein, the techniques disclosed herein facilitate reducing information to a set list of set keys (e.g., prime numbers or a product of prime numbers). Using numbers as the inputs of the machine-learning models increases the efficiency of the machine-learning model. That is, the set key may be the building block of the analysis performed by the machine-learning model.

Among others, examples of machine-learning models that may be used by the pattern component 134 include artificial neural networks, such as a recurrent neural network; decision tree learning; convolutional neural networks; deep learning architectures in which an output of a first layer of neurons becomes an input to a second layer of neurons, and so forth; support vector machines (e.g., including a separating hyperplane that categorizes data); regression analysis; Bayesian networks; genetic algorithms; Deep convolutional networks configured with additional pooling and normalization layers; and Deep belief networks.

In some examples, the pattern component 134 may perform pattern analysis on the set lists of the messages database 126 to determine when a topic is "trending." For example, the pattern component 134 may determine that a topic is appearing in social media messages at a threshold rate and determine that the identified topic is trending. In such examples, the pattern component 134 may notify and/or alert the user 116 of the trending topic. The user 116 may then proceed to engage in a social "conversation" based on the notification and/or alert.

In some examples, the pattern component 134 may perform pattern analysis on the set lists of the messages database 126 to identify one or more platform users that are bots that may be posting content to the social media services 111. For example, the pattern component 134 may identify a threshold quantity of social media messages with a same set list (e.g., either prime numbers or a composite number). Analysis of the identified social media messages may indicate that they include the same content and, thus, may be bots configured to post the content.

Figure 6:
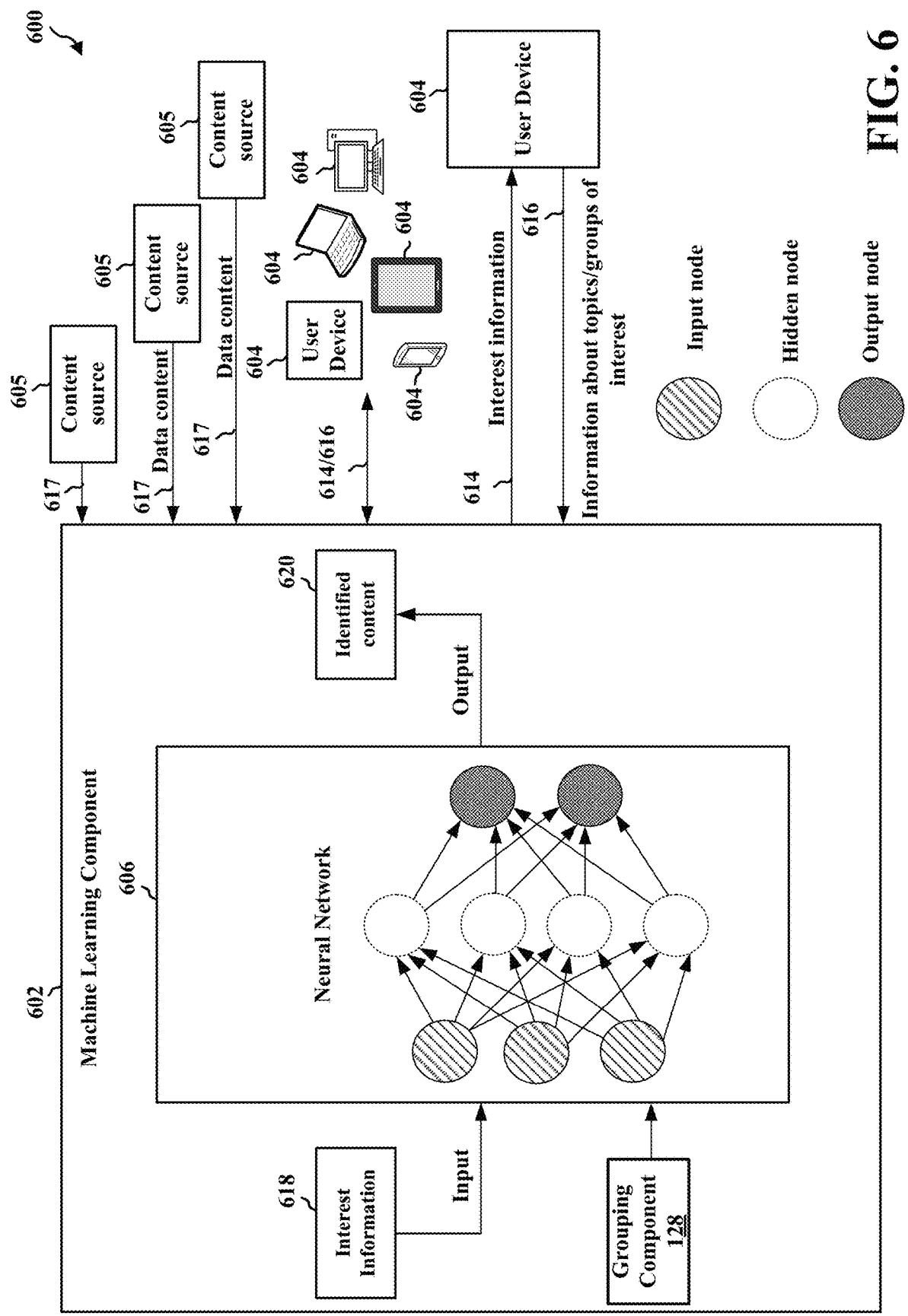
FIG. 6 illustrates a diagram of a content identification system that includes a neural network, or machine learning component or artificial intelligence component, configured to provide an identification of content for one or more users, in accordance with various aspects of the present disclosure.

FIG. 6 illustrates a diagram 600 of a content identification system 602 that includes a neural network 606, or machine learning component or artificial intelligence component, configured to provide an identification of content for one or more users. The content identification system 602 may receive information 614 from a user device 604 that indicates topics, groups, types of content, etc. that are of interest to the user. FIG. 6 illustrates that the content identification system 602 may receive information 614 from multiple user devices of various types. The information 614 may be based on user selection or user input that indicates interest in particular topics or types of content. In some aspects, the information 614 may include a search query or request for information from the user device 604. The information from the user device may include any of the aspects described herein, e.g., including at least FIGS. 2A, 2B, and 3. The content identification system 602 may include any of the components described in connection with FIG. 1, e.g., including a grouping component 128 that may group content 617 from various content sources 605 and/or other user devices as a part of identifying content of interest for a particular user. Once content is identified, e.g., based on the grouping and/or machine learning, an indication 616 may be transmitted to the user device 604. The indication 616 may be a displayed response to a search query, a message, a higher order of information displayed at the user device 604, or some other visual or audio indicator that identifies or flags information about the content at the user device 604. As illustrated in FIG. 6, the content identification system 602 may receive information 614 of interest, as well as content 617, from various different sources and types of user devices. As well, the content identification system 602 may identify content about topics, content, or groups that may be of interest to particular users to multiple different user devices.

FIG. 6 illustrates that an example neural network 606 may include a network of interconnected nodes. An output of one node is connected as the input to another node. Connections between nodes may be referred to as edges, and weights may be applied to the connections/edges to adjust the output from one node that is applied as the input to another node. Nodes may apply thresholds in order to determine whether, or when, to provide output to a connected node. The output of each node may be calculated as a non-linear function of a sum of the inputs to the node. The neural network 606 may include any number of nodes and any type of connections between nodes. The neural network 606 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse a layer multiple times. As an example, the system may input information 618 to the neural network 606, and may receive output 620. The output of identified content for a particular user may then be provided to a user device 604.

In some aspects, the neural network 606 may use machine-learning algorithms, deep-learning algorithms, neural networks, reinforcement learning, regression, boosting, or advanced signal processing methods for receiving content and identifying content of interest for particular users.

Reinforcement learning is a type of machine learning that involves the concept of taking actions in an environment in order to maximize a reward. Reinforcement learning is a machine learning paradigm. Other paradigms include supervised learning and unsupervised learning. Basic reinforcement may be modeled as a Markov decision process (MDP) with a set of environment states and agent states, as well as a set of actions of the agent. A determination may be made about a likelihood of a state transition based on an action and a reward after the transition. The action selection by an agent may be modeled as a policy. The reinforcement learning may enable the agent to learn an optimal, or nearly-optimal, policy that maximizes a reward. Supervised learning may include learning a function that maps an input to an output based on example input-output pairs, which may be inferred from a set of training data, which may be referred to as training examples. The supervised learning algorithm analyzes the training data and provides an algorithm to map to new examples.

Regression analysis may include statistical analysis to estimate the relationships between a dependent variable (e.g., an outcome variable) and one or more independent variables. Linear regression is an example of a regression analysis. Non-linear regression models may also be used. Regression analysis may include estimating, or determining, relationships of cause between variables in a dataset.

Boosting includes one or more algorithms for reducing variance or bias in supervised learning. Boosting may include iterative learning based on weak classifiers (e.g., that are somewhat correlated with a true classification) with respect to a distribution that is added to a strong classifier (e.g., that is more closely correlated with the true classification) in order to convert weak classifiers to stronger classifiers. The data weights may be readjusted through the process, e.g., related to accuracy.

Among others, examples of machine learning models or neural networks that may be included in the content identification system 602 include, for example, artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; deep convolutional networks (DCNs) configured with additional pooling and normalization layers; and deep belief networks (DBNs).

FIG. 6 illustrates an example machine learning model, such as an artificial neural network (ANN), that includes an interconnected group of artificial neurons (e.g., neuron models) as nodes. Neuron model connections may be modeled as weights, in some aspects. Machine learning models, such as the example in FIG. 6, may provide predictive modeling, adaptive control, and other applications through training via a dataset. A machine learning model may be adapted, e.g., based on external or internal information processed by the machine learning model. In some aspects, a machine learning model may include a non-linear statistical data model and/or a decision making model. Machine learning may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivated, compression, decompression, quantization, flattening, etc. The term layer may indicate an operation on input data. Weights, biases, coefficients, and operations may be adjusted in order to achieve an output closer to the target output. Weights and biases are examples of parameters of a trained machine learning model. Different layers of a machine learning model may be trained separately.

A variety of connectivity patterns, e.g., including any of feed-forward networks, hierarchical layers, recurrent architectures, feedback connections, etc., may be included in a machine learning model. Layer connections may be fully connected or locally connected. For a fully connected network, a first layer neuron may communicate an output to each neuron in a second layer. Each neuron in the second layer may receive input from each neuron in the first layer. For a locally connected network, a first layer neuron may be connected to a subset of neurons in the second layer, rather than to each neuron of the second layer. A convolutional network may be locally connected and may be configured with shared connection strengths associated with the inputs for each neuron in the second layer. In a locally connected layer of a network, each neuron in a layer may have the same, or a similar, connectivity pattern, yet having different connection strengths.

A machine learning model, artificial intelligence component, or neural network may be trained, such as training based on supervised learning. During training, the machine learning model may be presented with an input that the model uses to compute to produce an output. The actual output may be compared to a target output, and the difference may be used to adjust parameters (e.g., weights, biases, coefficients, etc.) of the machine learning model in order to provide an output closer to the target output. Before training, the output may not be correct or may be less accurate. A difference between the output and the target output, may be used to adjust weights of a machine learning model to align the output is more closely with the target.

A learning algorithm may calculate a gradient vector for adjustment of the weights. The gradient may indicate an amount by which the difference between the output and the target output would increase or decrease if the weight were adjusted. The weights, biases, or coefficients of the model may be adjusted until an achievable error rate stops decreasing or until the error rate has reached a target level.

Machine learning model training may include computational complexity and substantial processing. Aspects presented herein assist in reducing computational complexing and processing in order to provide identification of content of interest for users.

Figure 7:
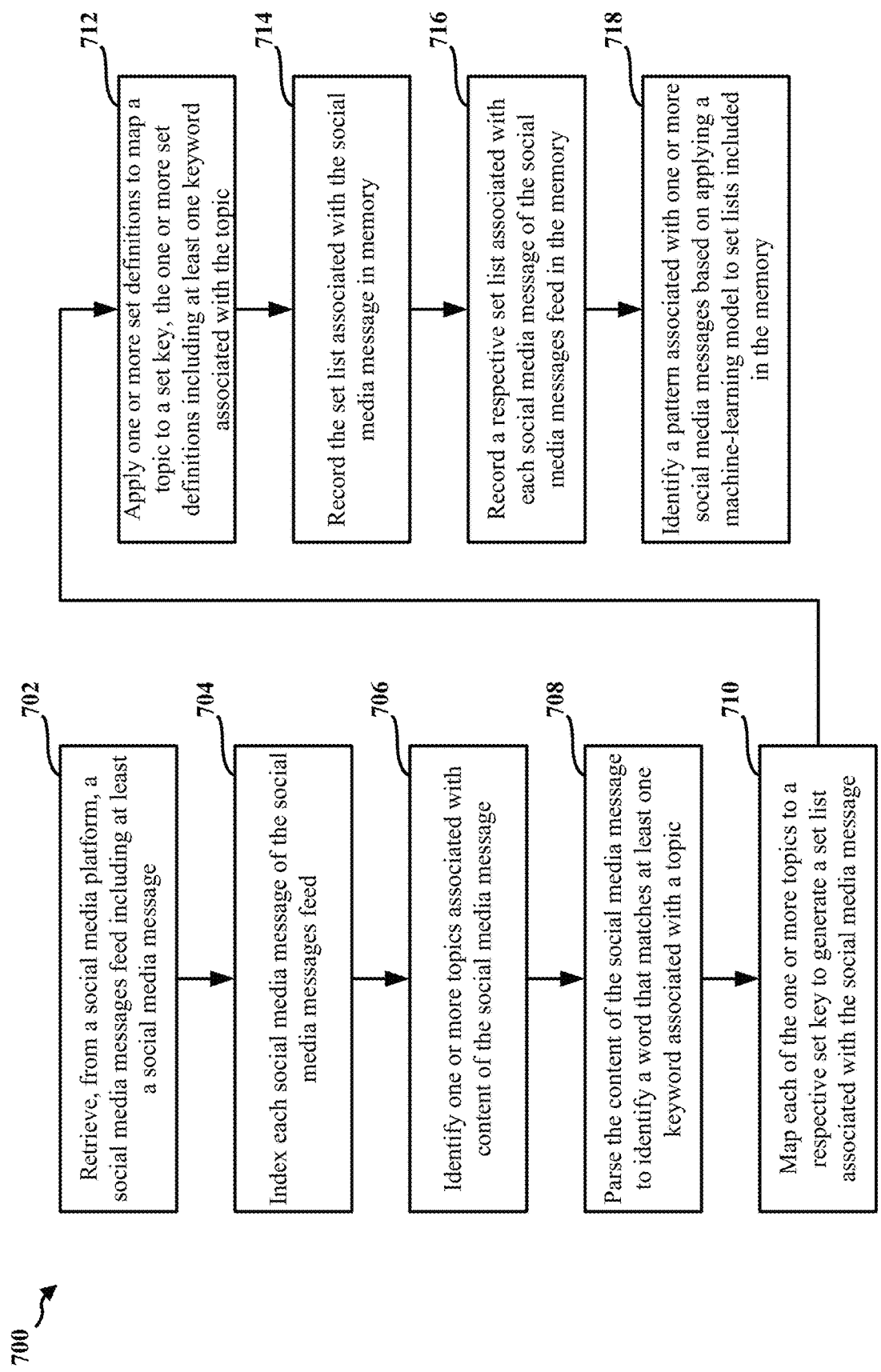
FIG. 7 is a flowchart illustrating a method for information modeling of social media messages, in accordance with various aspects of the present disclosure.

FIG. 7 is a method 700 of information modeling of social media messages, in accordance with aspects presented herein. The method 700 may be performed by the recommendation service 120 and/or a sub-component of the recommendation service 120 of FIG. 1. The method 700 enables processing streams of information in a way that facilitates delivering novel insights (e.g., actions).

The method 700 begins at step 702 in which a recommendation service may retrieve, from a social media platform, a social media messages feed including at least a social media message. For example, the feed component 124 of FIG. 1 may retrieve a social media messages feed from the social networking platform 110. The social media messages feed may include the social media message 114 posted by a platform user 112a to the social media services 111.

At step 704, the recommendation service may index each social media message of the social media messages feed. For example, the feed component 124 may index each social media message in the messages database 126 of FIG. 1.

At step 706, the recommendation service identifies one or more topics associated with content of the social media message. For example, the grouping component 128 may identify at least one topic associated with the content 114a of the social media message 114.

In some examples, identifying the one or more topics may include the recommendation service parsing, at step 708, the content of the social media message to identify a word that matches at least one keyword associated with a topic. For example, the grouping component 128 may determine that the content 114a of the social media message 114 includes the word "restaurants," which is associated with the set (or topic) "Entertainment" in the example of FIG. 4. In some examples, the at least one keyword may be associated with a plurality of topics. For example, and referring to the example data table 400 of FIG. 4, the keyword "Cat" is associated with the "Animal" set, the "Feline" set, and the "Land Animal" set.

At step 710, the recommendation service maps each of the one or more topics to a respective set key to generate a set list associated with the social media message. For example, and referring to the example data table 400 of FIG. 4, the grouping component 128 may map the "Entertainment" set to the set key "17." In some examples, the respective set key may include a unique prime number. For example, each set key in the example of FIG. 4 is associated with a different respective set (or topic) and each set key is a unique prime number.

In some examples, mapping each of the one or more topics to a respective set key may include the recommendation service, at step 712, applying one or more set definitions to map a topic to a set key, as described in connection with the example data table 400 of FIG. 4. In some examples, the one or more set definitions may include at least one keyword associated with the topic. For example, the "Entertainment" set is associated with the keywords (or set elements) "Restaurants," "Clubs," and "Shows."

In some examples, the set list associated with the social media message may include the respective set key for each of the one or topics, as described in connection with the first set list column 508 and/or the second set list column 510 of FIG. 5. In some examples, the set list associated with the social media message may include a composite number based on the respective set key for each of the one or more topics, as described in connection with the example third set list column 512 and/or the fourth set list column 514 of FIG. 5. In some examples, the one or more set definitions may be pre-defined. In some examples, the one or more set definitions may be user generated. In some examples, the one or more set definitions may be generated based on analysis of the set list.

At step 714, the recommendation service records the set list associated with the social media message in memory. For example, the grouping component 128 may record the set list (e.g., the set keys included in the first set list column 508, the second set list column 510, third set list column 512 and/or the fourth set list column 514 of FIG. 5) in the messages database 126. In some examples, the memory may include persistent memory. At step 716, the recommendation service may record a respective set list associated with each social media message of the social media messages feed in the memory.

At step 718, the recommendation service may identify a pattern associated with one or more social media messages based on applying a machine-learning model to set lists included in the memory. For example, the pattern component 134 of FIG. 1 may apply a machine-learning model to identify the pattern. In some examples, the pattern may include identifying a trending topic. In some examples, the pattern may include identifying a platform user that is a bot. In some examples, the pattern may include identifying metrics associated with one or more social media messages.

Figure 8:
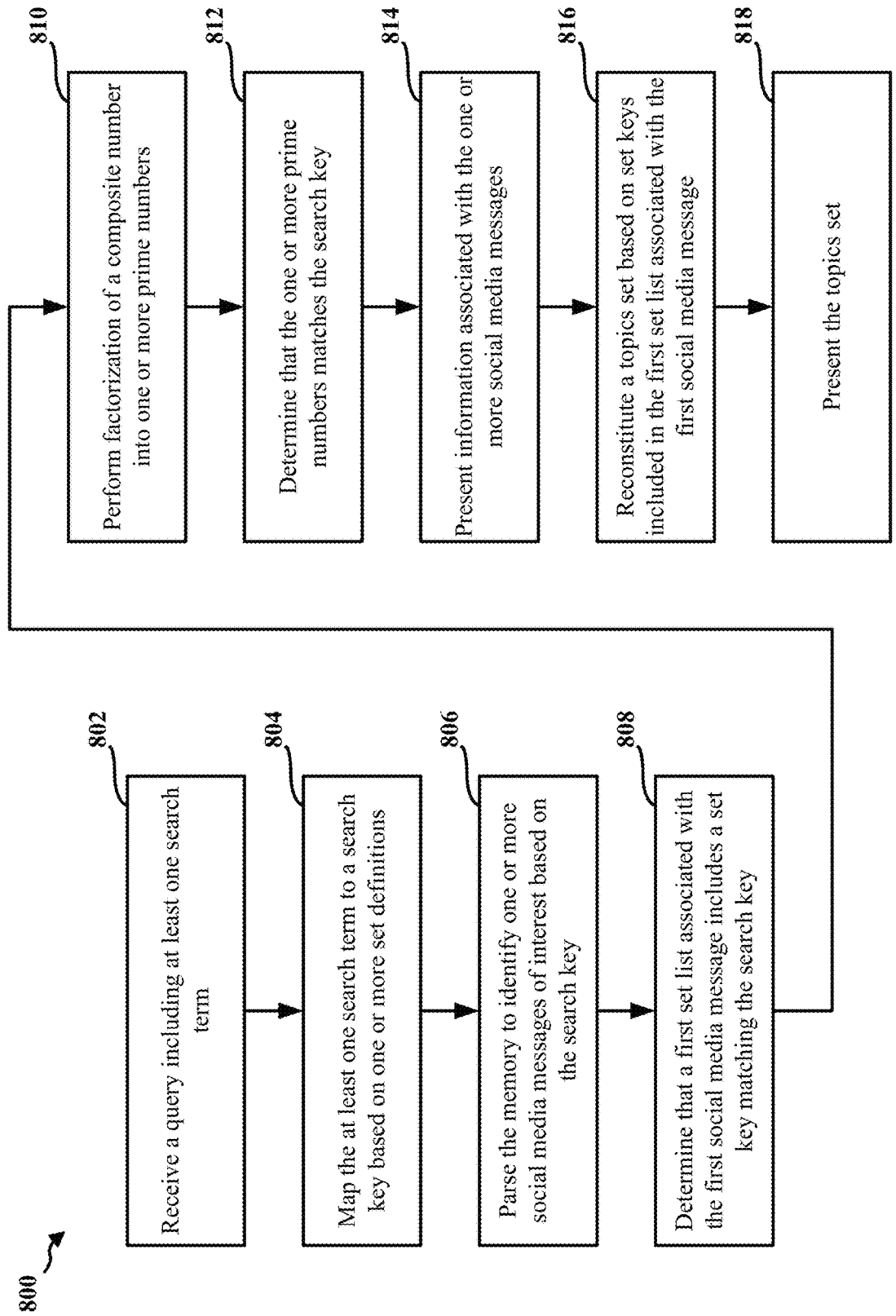
FIG. 8 is a flowchart illustrating a method for performing a query of social media messages, in accordance with various aspects of the present disclosure.

FIG. 8 is a method 800 of performing a query of social media messages, in accordance with aspects presented herein. The method 800 may be performed by the recommendation service 120 and/or a sub-component of the recommendation service 120 of FIG. 1. The method 800 enables processing streams of information in a way that facilitates delivering novel insights (e.g., actions).

The method 800 begins at step 802 in which a recommendation service may receive a query including at least one search term. For example, the query component 132 may receive a query including a search term, such as the term "Vehicle," from the application 117.

At step 804, the recommendation service may map the at least one search term to a search key based on or more set definitions. For example, the query component 132 may apply the one or more set definitions of FIG. 4 to map the term "Vehicle" to the search key "5."

At step 806, the recommendation service may parse the memory to identify one or more social media messages of interest based on the search key. For example, the query component 132 may parse the example data table 500 of FIG. 5 to identify one or more social media messages of interest. In some examples, identifying a first social media message of interest may include determining, at step 808, that a first set list associated with the first social media message includes a set key matching the search key. For example, the query component 132 may determine that the set list associated with the second social media message associated with the message ID "0002" includes the search key "5" based on, for example, the first set list column 508 and/or the second set list column 510.

In some examples, the first set list may include a composite number, such as the example third set list column 512 and/or the fourth set list column 514 of FIG. 5. In such examples, the recommendation service may, at step 810, perform prime factorization of the component number into one or more prime numbers. For example, the query component 132 may perform prime factorization of the composite number "17017" to determine the prime numbers "7," "11," "13," and "17," and may perform prime factorization of the composite number "1435" to determine the prime numbers "5," "7," and "41." The query component 132 may then parse the determine prime numbers to identify the first set list associated with the first social media message includes a set key matching the search key. For example, the query component 132 may determine that, with respect to the example of FIG. 5, the second social media message associated with the message ID "0002" includes the search key "5" based on, for example, performing the prime factorization of the third set list column 512 and/or the fourth set list column 514.

At step 814, the recommendation service may present information associated with the one or more social media messages of interest. For example, the query component 132 may present the content of the one or more social media messages of interest, as described in connection with the example second panel 320 of FIG. 3.

In some examples, presenting information associated with the one or more social media messages of interest may include displaying topics related to the one or more social media messages of interest. For example, at step 816, the recommendation service may reconstitute a topics set based on set keys included in the first set associated with the first social media message. For example, the query component 132 may apply the one or more set definitions of FIG. 4 to determine that the set list associated with the second social media message associated with the message ID "0002" includes the set keys "5," "7," and "41," which correspond to the "Vehicle" set, the "Platform" set, and the "Color" set, respectively. At step 818, the recommendation service may present the topics set. For example, the query component 132 may present the topics set including the "Vehicle" set, the "Platform" set, and the "Color" set via the application 117.

Figure 9:
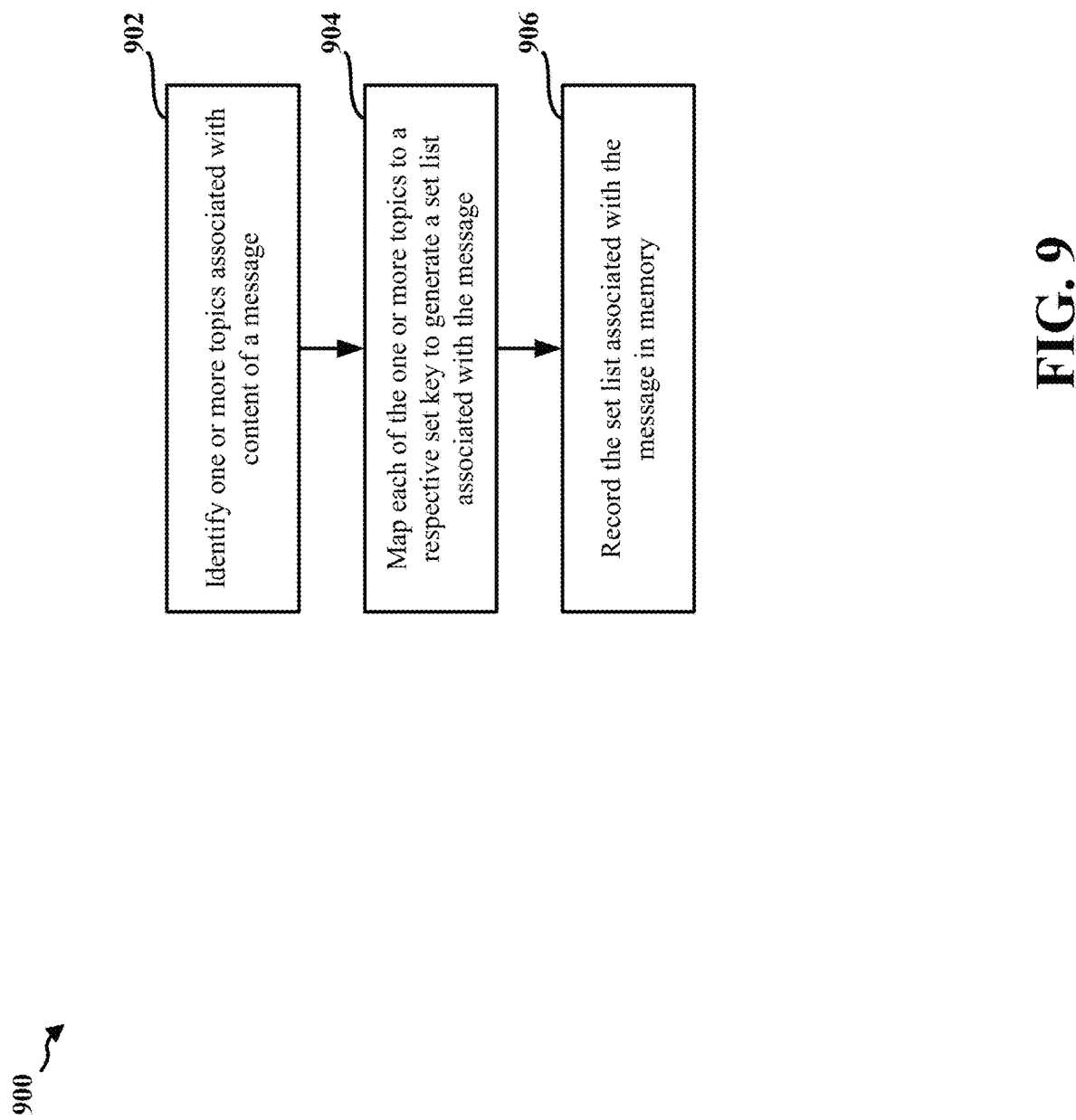
FIG. 9 is a flowchart illustrating a method for information modeling, in accordance with various aspects of the present disclosure.

FIG. 9 is a method of information modeling, in accordance with aspects presented herein. The method 900 may be performed by the recommendation service 120 and/or a sub-component of the recommendation service 120 of FIG. 1. The method 800 enables processing streams of information in a way that facilitates delivering novel insights (e.g., actions).

The method 900 begins at step 902 in which a recommendation service may identify one or more topics associated with content of a message. The content of the message may include text, images, data, etc. In some examples, the message may include a social media message. Aspects of the identifying of the one or more topics, with respect to a social media message, are described in connection with step 706 and step 708 of FIG. 7.

At step 904, the recommendation service may map each of the one or more topics to a respective set key to generate a set list associated with the message. Aspects of the mapping the one or more topics to a respective set key, with respect to a social media message, are described in connection with step 710 and step 712 of FIG. 7.

At step 906, the recommendation service may record the set list associated with the message in memory. Aspects of the recording of the set list associated with the message in the memory, with respect to a social media message, are described in connection with step 714 and step 716 of FIG. 7.

Figure 10:
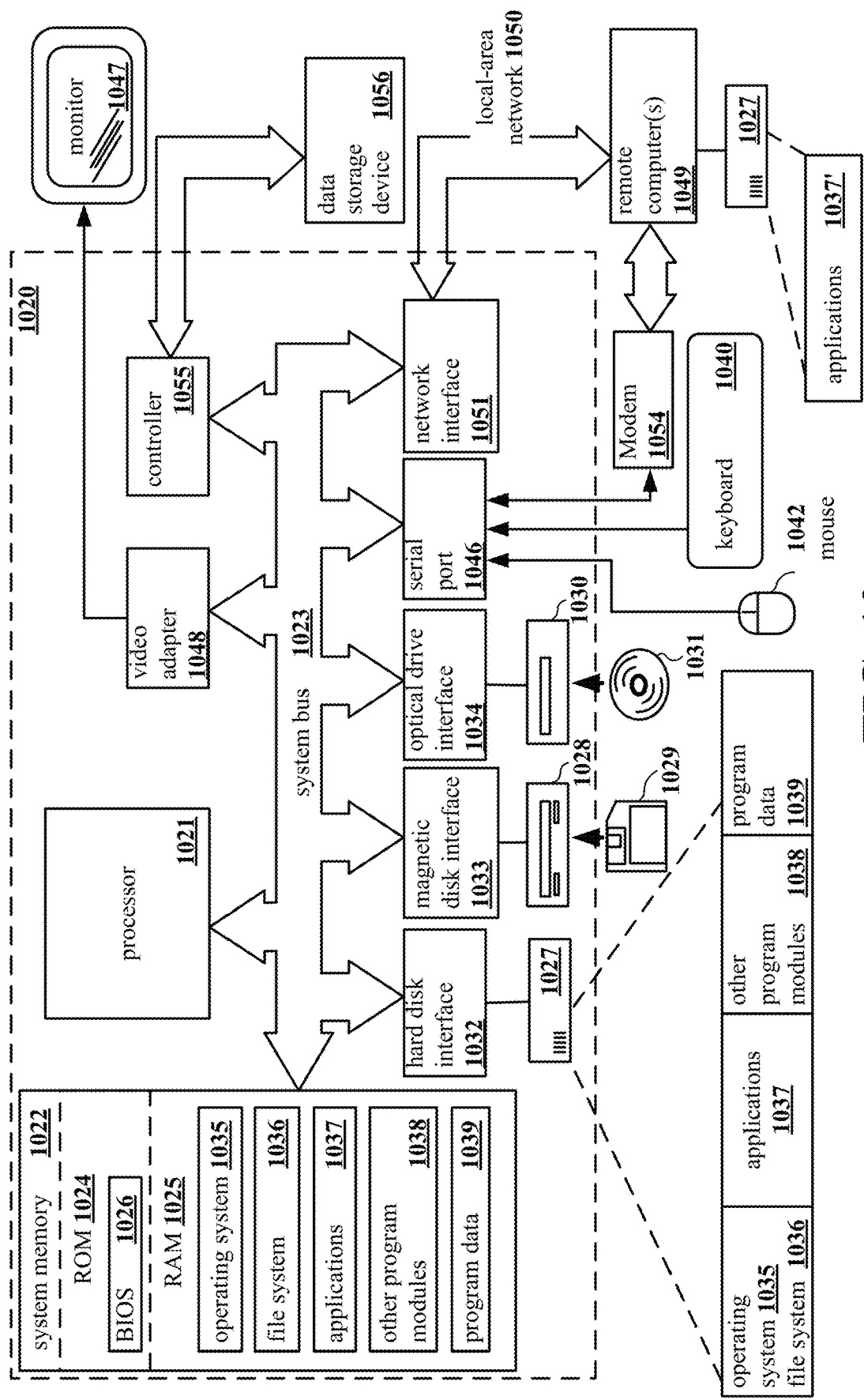
FIG. 10 is a block diagram of a computer system on which the disclosed system and method can be implemented, in accordance with various aspects of the present disclosure.

FIG. 10 is a block diagram illustrating a general-purpose computer system 1020 on which aspects of systems and methods for processing files stored in object storage systems may be implemented in accordance with an example aspect. The computer system 1020 can correspond to the physical server(s) on which the application 117 and/or the recommendation service 120 is executing, for example, described earlier.

As shown, the computer system 1020 (which may be a personal computer or a server) includes a central processing unit 1021, a system memory 1022, and a system bus 1023 connecting the various system components, including the memory associated with the central processing unit 1021. As will be appreciated by those of ordinary skill in the art, the system bus 1023 may comprise a bus memory or bus memory controller, a peripheral bus, and a local bus that is able to interact with any other bus architecture. The system memory may include permanent memory (ROM) 1024 and random-access memory (RAM) 1025. The basic input/output system (BIOS) 1026 may store the basic procedures for transfer of information between elements of the computer system 1020, such as those at the time of loading the operating system with the use of the ROM 1024.

The computer system 1020 may also comprise a hard disk 1027 for reading and writing data, a magnetic disk drive 1028 for reading and writing on removable magnetic disks 1029, and an optical drive 1030 for reading and writing removable optical disks 1031, such as CD-ROM, DVD-ROM and other optical media. The hard disk 1027, the magnetic disk drive 1028, and the optical drive 1030 are connected to the system bus 1023 across the hard disk interface 1032, the magnetic disk interface 1033, and the optical drive interface 1034, respectively. The drives and the corresponding computer information media are power-independent modules for storage of computer instructions, data structures, program modules, and other data of the computer system 1020.

An example aspect comprises a system that uses a hard disk 1027, a removable magnetic disk 1029 and a removable optical disk 1031 connected to the system bus 1023 via the controller 1055. It will be understood by those of ordinary skill in the art that any type of media 1056 that is able to store data in a form readable by a computer (solid state drives, flash memory cards, digital disks, random-access memory (RAM) and so on) may also be utilized.

The computer system 1020 has a file system 1036, in which the operating system 1035 may be stored, as well as additional program applications 1037, other program modules 1038, and program data 1039. A user of the computer system 1020 may enter commands and information using keyboard 1040, mouse 1042, or any other input device known to those of ordinary skill in the art, such as, but not limited to, a microphone, joystick, game controller, scanner, etc. Such input devices typically plug into the computer system 1020 through a serial port 1046, which in turn is connected to the system bus, but those of ordinary skill in the art will appreciate that input devices may be also be connected in other ways, such as, without limitation, via a parallel port, a game port, or a universal serial bus (USB). A monitor 1047 or other type of display device may also be connected to the system bus 1023 across an interface, such as a video adapter 1048. In addition to the monitor 1047, the personal computer may be equipped with other peripheral output devices (not shown), such as loudspeakers, a printer, etc.

Computer system 1020 may operate in a network environment, using a network connection to one or more remote computers 1049. The remote computer (or computers) 1049 may be local computer workstations or servers comprising most or all of the aforementioned elements in describing the nature of a computer system 1020. Other devices may also be present in the computer network, such as, but not limited to, routers, network stations, peer devices or other network nodes.

Network connections can form a local-area computer network (LAN) 1050 and a wide-area computer network (WAN). Such networks are used in corporate computer networks and internal company networks, and they generally have access to the Internet. In LAN or WAN networks, the computer system 1020 is connected to the local-area network 1050 across a network adapter or network interface 1051. When networks are used, the computer system 1020 may employ a modem 1054 or other modules well known to those of ordinary skill in the art that enable communications with a wide-area computer network such as the Internet. The modem 1054, which may be an internal or external device, may be connected to the system bus 1023 by a serial port 1046. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with particular functions facilitated by hardware alone, and other functions facilitated by a combination of hardware and software. In particular implementations, at least a portion, and in some cases, all, of a module may be executed on the processor of a general purpose computer. Accordingly, each module may be realized in a variety of suitable configurations, and should not be limited to any particular implementation exemplified herein.

In one configuration, the recommendation service 120 and/or the computer system 1020, and in particular, the file system 1036 and/or the processor 1021, includes means for identifying one or more topics associated with content of a social media message; mapping each of the one or more topics to a respective set key to generate a set list associated with the social media message; and recording the set list associated with the social media message in memory.

In another configuration, the recommendation service 120 and/or the computer system 1020, and in particular, the file system 1036 and/or the processor 1021, further includes means parsing the content of the social media message to identify a word that matches at least one keyword associated with a topic.

In another configuration, the recommendation service 120 and/or the computer system 1020, and in particular, the file system 1036 and/or the processor 1021, further includes means retrieving, from a social networking platform, a social media messages feed including at least the social media message; indexing each social media message of the social media messages feed; and recording a respective set list associated with each social media message of the social media messages feed in the memory.

In another configuration, the recommendation service 120 and/or the computer system 1020, and in particular, the file system 1036 and/or the processor 1021, further includes means applying one or more set definitions to map a topic to a set key, the one or more set definitions including at least one keyword associated with the topic.

In another configuration, the recommendation service 120 and/or the computer system 1020, and in particular, the file system 1036 and/or the processor 1021, further includes means receiving a query including at least one search term; mapping the at least one search term to a search key based on one or more set definitions; parsing the memory to identify one or more social media messages of interest based on the search key; and presenting information associated with the one or more social media messages.

In another configuration, the recommendation service 120 and/or the computer system 1020, and in particular, the file system 1036 and/or the processor 1021, further includes means determining that a first set list associated with the first social media message includes a set key matching the search key.

In another configuration, the recommendation service 120 and/or the computer system 1020, and in particular, the file system 1036 and/or the processor 1021, further includes means performing factorization of the composite number into one or more prime numbers; and determining that the one or more prime numbers matches the search key.

In another configuration, the recommendation service 120 and/or the computer system 1020, and in particular, the file system 1036 and/or the processor 1021, further includes means reconstituting a topics set based on set keys included in the first set list associated with the first social media message; and presenting the topics set.

In another configuration, the recommendation service 120 and/or the computer system 1020, and in particular, the file system 1036 and/or the processor 1021, further includes means identifying a pattern associated with one or more social media messages based on applying a machine-learning model to set lists included in the memory.

In another configuration, the recommendation service 120 and/or the computer system 1020, and in particular, the file system 1036 and/or the processor 1021, further includes means identifying a trending topic.

In another configuration, the recommendation service 120 and/or the computer system 1020, and in particular, the file system 1036 and/or the processor 1021, further includes means identifying a platform user that is a bot.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents. In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for information modeling, comprising:
   identifying one or more topics associated with content of a social media message;
   mapping each of the one or more topics to a respective set key to generate a set list associated with the social media message, different set keys mapping to different unique prime numbers;
   recording the set list associated with the social media message in memory;
   receiving a query including at least one search term;
   mapping the at least one search term to a search key based on one or more set definitions;
   parsing the memory to identify one or more social media messages of interest based on the search key; and
   presenting information associated with the one or more social media messages of interest,
   wherein identifying the one or more social media messages of interest includes:
      determining that a first set list associated with at least a first social media message includes a set key matching the search key, the first set list including a composite number;
      performing factorization of the composite number into one or more prime numbers; and
      determining that the one or more prime numbers matches the search key.

2. The computer-implemented method of claim 1, wherein the respective set key includes a unique prime number.

3. The computer-implemented method of claim 1, wherein identifying the one or more topics associated with the social media message includes:
   parsing the content of the social media message to identify a word that matches at least one keyword associated with a topic.

4. The computer-implemented method of claim 3, wherein the at least one keyword is associated with a plurality of topics.

5. The computer-implemented method of claim 1, further including:
   retrieving, from a social networking platform, a social media messages feed including at least the social media message;
   indexing each social media message of the social media messages feed; and recording a respective set list associated with each social media message of the social media messages feed in the memory.

6. The computer-implemented method of claim 1, wherein the set list associated with the social media message includes the respective set key for each of the one or more topics.

7. The computer-implemented method of claim 1, wherein the set list associated with the social media message includes a second composite number based on the respective set key for each of the one or more topics.

8. The computer-implemented method of claim 1, further comprising:
   applying a second set of one or more set definitions to map a topic to a second set key, the second set of one or more set definitions including at least one keyword associated with the topic.

9. The computer-implemented method of claim 8, wherein the one or more set definitions are at least one of: pre-defined; user generated; and generated based on analysis of the set list.

10. The computer-implemented method of claim 1, wherein presenting the information associated with the one or more social media messages includes:
    reconstituting a topics set based on set keys included in the first set list associated with the first social media message; and
    presenting the topics set.

11. The computer-implemented method of claim 1, further comprising:
    identifying a pattern associated with a second set of one or more social media messages based on applying a machine-learning model to set lists included in the memory.

12. The computer-implemented method of claim 11, wherein the pattern includes identifying a trending topic.

13. The computer-implemented method of claim 11, wherein the pattern includes identifying a platform user that is a bot.

14. The computer-implemented method of claim 1, wherein the memory includes persistent memory.

15. A computer apparatus for information modeling, comprising:
    a memory; and
    at least one processor coupled to the memory and configured to:
        identify one or more topics associated with content of a social media message;
        map each of the one or more topics to a respective set key to generate a set list associated with the social media message, different set keys mapping to different unique prime numbers;
        record the set list associated with the social media message in persistent memory;
        receive a query including at least one search term;
        map the at least one search term to a search key based on one or more set definitions;
        parse the memory to identify one or more social media messages of interest based on the search key; and
        present information associated with the one or more social media messages of interest,
        wherein identifying the one or more social media messages of interest includes:
            determining that a first set list associated with at least a first social media message includes a set key matching the search key, the first set list including a composite number;
            performing factorization of the composite number into one or more prime numbers; and
            determining that the one or more prime numbers matches the search key.

16. A non-transitory computer-readable medium storing computer executable code for information modeling, comprising code to:
    identifying one or more topics associated with content of a social media message;
    mapping each of the one or more topics to a respective set key to generate a set list associated with the social media message, different set keys mapping to different unique prime numbers;
    recording the set list associated with the social media message in memory;
    receiving a query including at least one search term;
    mapping the at least one search term to a search key based on one or more set definitions;
    parsing the memory to identify one or more social media messages of interest based on the search key; and
    presenting information associated with the one or more social media messages of interest,
    wherein identifying the one or more social media messages of interest includes:
        determining that a first set list associated with at least a first social media message includes a set key matching the search key, the first set list including a composite number;
        performing factorization of the composite number into one or more prime numbers; and
        determining that the one or more prime numbers matches the search key.

* * * * *